United States Patent [19]

Jennings

[11] Patent Number: 4,896,484
[45] Date of Patent: Jan. 30, 1990

[54] SPLIT CUTTERBAR DRIVE MECHANISM
[75] Inventor: Richard E. Jennings, Manheim, Pa.
[73] Assignee: Ford New Holland, Inc., New Holland, Pa.
[21] Appl. No.: 240,854
[22] Filed: Sep. 2, 1988
[51] Int. Cl.[4] .................... A01D 34/66; A01D 34/76
[52] U.S. Cl. .......................................... 56/6; 56/13.5; 56/16.9; 56/235; 56/255; 56/DIG. 6
[58] Field of Search ................ 56/13.6, 16.4, DIG. 6, 56/16.9, 6, 295, 192, 255, 235; 74/417, 665 GB, 606 R

[56]  References Cited
U.S. PATENT DOCUMENTS

| | | | |
|---|---|---|---|
| 3,138,911 | 6/1964 | Pounds | 56/235 |
| 3,415,043 | 12/1968 | Shones | 56/6 |
| 3,457,714 | 7/1969 | Kamlukin | 56/503 |
| 3,483,685 | 12/1969 | Guillotin | 56/6 |
| 3,508,385 | 4/1970 | Carlson | 56/13.6 |
| 3,716,973 | 2/1973 | Kidd | 56/6 |
| 3,965,658 | 6/1976 | van der Lely | 56/6 |
| 4,007,578 | 2/1977 | Borstel, Jr. | 56/192 |
| 4,287,790 | 9/1981 | Fujiwara et al. | 74/417 |
| 4,299,077 | 11/1981 | Wattron | 56/6 |
| 4,302,922 | 12/1981 | Guerndt, Jr. et al. | 56/235 |
| 4,502,268 | 3/1985 | Kulak | 56/295 |
| 4,730,445 | 3/1988 | Wolff | 56/13.6 |
| 4,739,609 | 4/1988 | Meier et al. | 56/16.4 |

Primary Examiner—Bruce M. Kisliuk
Attorney, Agent, or Firm—Larry W. Miller; Frank A. Seemar; Darrell F. Marquette

[57] ABSTRACT

A disc mower-conditioner having the disc cutterbar driven at each end thereof, the rotational power being delivered to the outboard end of the disc cutterbar by a power transfer mechanism rotated above the disc cutterbar, is disclosed wherein the drive mechanism includes a gearbox operable to receive rotational power from a power input shaft and transfer rotational power to three output shafts to operably power equally the opposing ends of the disc cutterbar and to power the rotation of the conditioning rolls positioned rearwardly thereof. The gearbox is provided with a removable lid rotatably supporting the output shaft operably associated with the power transfer mechanism to deliver rotational power to the outboard end of the disc cutterbar.

8 Claims, 4 Drawing Sheets

SPLIT CUTTERBAR DRIVE MECHANISM

BACKGROUND OF THE INVENTION

The present invention relates generally to crop harvesting machines, commonly referred to as disc mower-conditioners and, more particularly, to a drive mechanism for providing rotational power to opposing ends of a disc cutterbar.

Typically, disc cutterbars having a plurality of rotatably mounted disc cutters are operably driven from one end of the cutterbar with the power being transferred via a drive train from disc cutter to disc cutter. Splitting the drive to opposing ends of the cutterbar can be accomplished by utilizing the rotating conditioning mechanism as a means for transferring rotational power from one transverse side of the machine to the other. Such devices would require additional gearboxes to deliver the rotational power to the opposing end of the disc cutterbar. Such devices would be inherently expensive because of the additional gearboxes required. Accordingly, it would be desirable to provide a drive mechanism for a disc mower-conditioner in which the rotational power could be delivered to opposing ends of the disc cutterbar in an economical and efficient manner.

SUMMARY OF THE INVENTION

It is an object of this invention to overcome the aforementioned disadvantages of the prior art by providing a drive mechanism for a disc mower-conditioner utilizing a gearbox in which rotational power can be equally divided between two output shafts for delivery to opposing ends of the disc cutterbar.

It is another object of this invention to provide a gearbox for the drive mechanism on a disc mower-conditioner which would have common components that would be utilized for alternative configurations providing rotational power to one end of the disc cutterbar or, alternatively, to opposing ends of the disc cutterbar.

It is a feature of this invention that the removable lid for the gearbox forming part of the disc mower-conditioner drive mechanism can be provided with an output shaft rotatably supported therein for engagement with a main drive gear in the gearbox.

It is an advantage of this invention that rotational power can be delivered to the opposing end of the disc cutterbar on a disc mower-conditioner via a belt drive mechanism interconnecting an output shaft from the gearbox to the opposing end disc cutter.

It is another advantage of this invention that the output shafts and pinions corresponding to the drive mechanism associated with the opposing ends of the disc cutterbar are substantially identical.

It is another feature of this invention that the rotational power delivered to the output shafts corresponding to the drive mechanism associated with the opposing ends of the disc cutterbar are engaged with a main drive gear within the gearbox to equally divide the rotational power delivered thereby.

It is yet another advantage of this invention that rotational power can be delivered to the opposing end of a disc cutterbar by utilizing a minimal number of additional components when compared to the drive mechanism for providing rotational power to only one end of the disc cutterbar.

It is still another object of this invention to provide a drive mechanism for a disc mower-conditioner to provide rotational power to opposing ends of the disc cutterbar while utilizing only a single gearbox.

It is a further object of this invention to provide a drive mechanism providing rotational power to opposing ends of the disc cutterbar on a disc mower-conditioner, which is durable in construction, inexpensive of manufacture, carefree of maintenance, fascile in assemblage, and simple and effective in use.

These and other objects, features and advantages are accomplished according to the instant invention by providing a disc mower-conditioner having the disc cutterbar being driven at each end thereof, the rotational power being delivered to the outboard end of the disc cutterbar by a power transfer mechanism rotated above the disc cutterbar, is disclosed wherein the drive mechanism includes a gearbox operable to receive rotational power from a power input shaft and transfer rotational power to three output shafts to operably power equally the opposing ends of the disc cutterbar and to power the rotation of the conditioning rolls positioned rearwardly thereof. The gearbox is provided with a removable lid rotatably supporting the output shaft operably associated with the power transfer mechanism to deliver rotational powre to the outboard end of the disc cutterbar.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
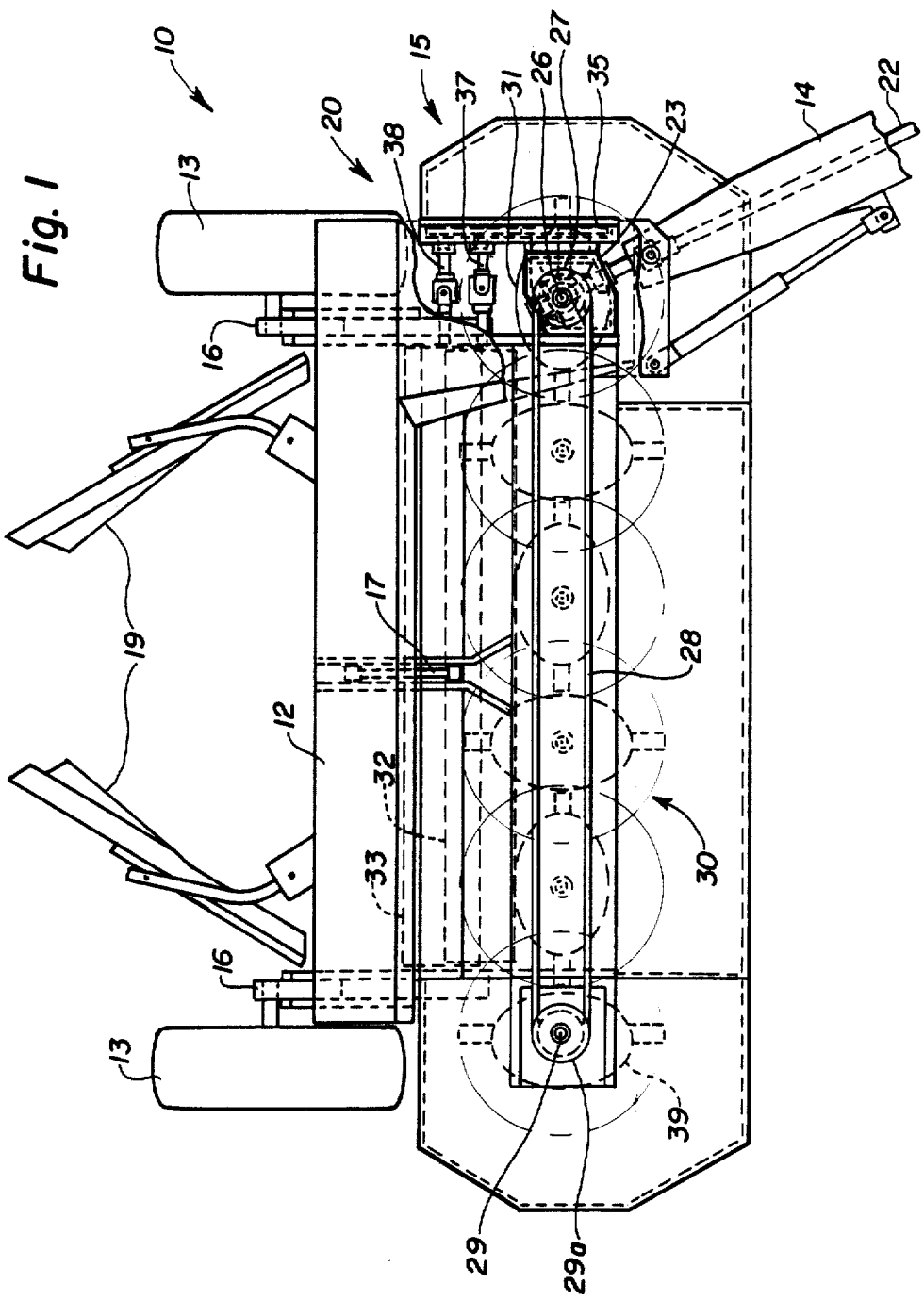
FIG. 1 is a partial top plan view of a disc mower-conditioner incorporating the principles of the instant invention, the forward portion of the draft tongue and power input shaft being broken away.

Referring now to the drawings and particularly, to FIG. 1, a top plan view of a crop harvesting machine, commonly referred to as a disc mower-conditioner, can be seen. Any left and right references are used as a matter of convenience and are determined by standing at the rear of the machine, facing the forward end, the direction of travel.

Figure 2:
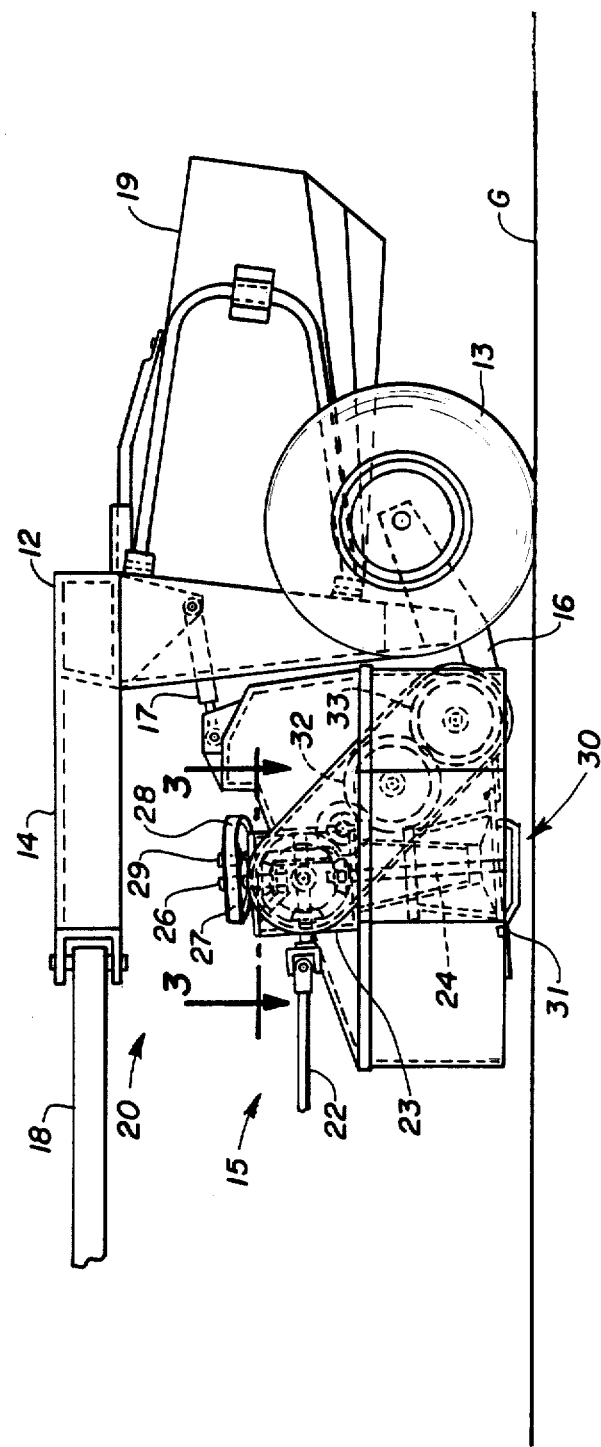
FIG. 2 is a left side elevational view of the disc mower-conditioner seen in FIG. 1.

Referring to FIGS. 1 and 2, it can be ssen that the disc mower-conditioner 10 is provided with a frame 12 supported over the ground G by ground engaging wheels 13. The disc mower-conditioner 10 includes a header 15 supported from the frame 12 by lower header lift links 16 and a centrally positioned adjustable upper header lift link 17 to permit generally vertical movement of the header 15 relative to the frame 12 by a conventional lift mechanism (not shown), such as a hydraulic cylinder. The frame 12 also includes a forwardly projecting portion 14 which is pivotally connected to a draft tongue 18, adaptable at the forward end thereof for connection to a towing vehicle, such as a tractor, in a conventional manner (not shown). The frame 12 also supports a pair of rearwardly converging windrow shields 19 operable to form a windrow of crop material after being discharged from the header 15.

Referring now to FIGS. 1–4, the drive mechanism 20 can best be seen. A power input shaft 22 extends forwardly for connection to a rotating member on the prime mover (not shown), such as a tractor power take off shaft. One skilled in the art will readily realize that FIGS. 1 and 2 have the forward portions of the tongue 18 and the power input shaft 22 broken away; however, connection thereof to the prime mover is conventional and well known in the art. The power input shaft 22 delivers rotational power to a gearbox 23 forming a part of the header 15 to be movable therewith. The gearbox 23 is provided with a first output shaft 24 extending in a generally downward direction to provide rotational power to the left end of the disc cutterbar. the gearbox 23 is also provided with a second output shaft 26 extending generally upwardly therefrom and terminating in a sheave 27 affixed thereto. A power transfer mechanism 28 in the form of an endless belt transfers the rotational power from the second output shaft 26 to a driven shaft 29 and affixed sheave 29a corresponding to the right end of the disc cutterbar 30. Accordingly, the disc cutterbar 30 is provided with a source of rotational power to both opposing ends thereof with the shaft 29 driving the outermost end disc cutter 39 and the shaft 24 driving the innermost end disc cutter 31.

Rotational power is also delivered to the upper conditioning roll 32 and the lower conditioning roll 33 by a third output shaft 34 laterally extending from the gearbox 23 into an enclosed gearset 35 in a known manner. Coupling shafts 37, 38 interconnect corresponding gears within the gearset 35 to provide counterrotational power to the conditioning rolls 32, 33, which are operable in a traditional manner.

Figure 3:
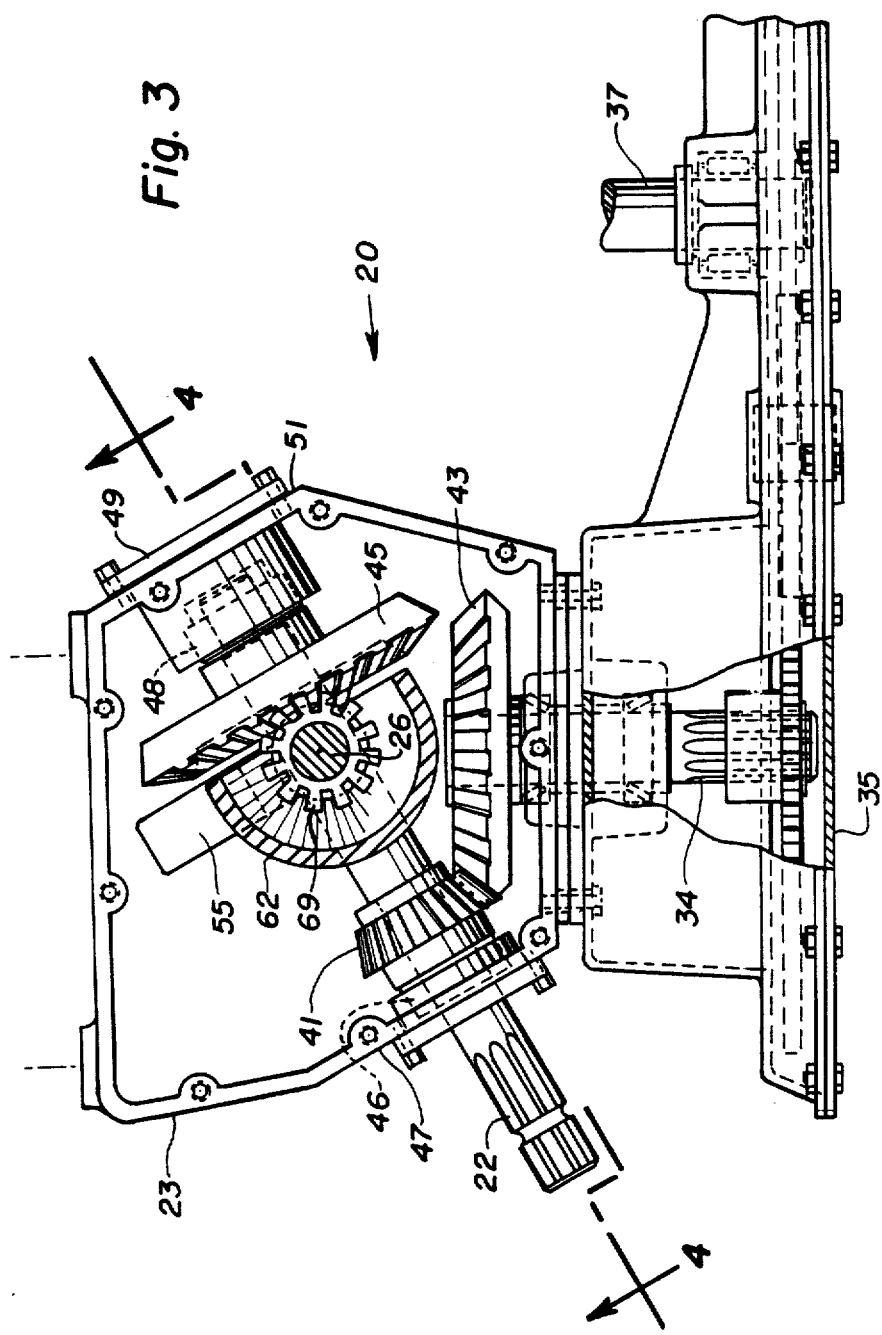
FIG. 3 is an enlarged partial cross-sectional view of the drive mechanism taken along lines 3—3 of FIG. 2 to show the gearbox and associated drive components providing rotational power to the conditioning rolls.
Figure 4:
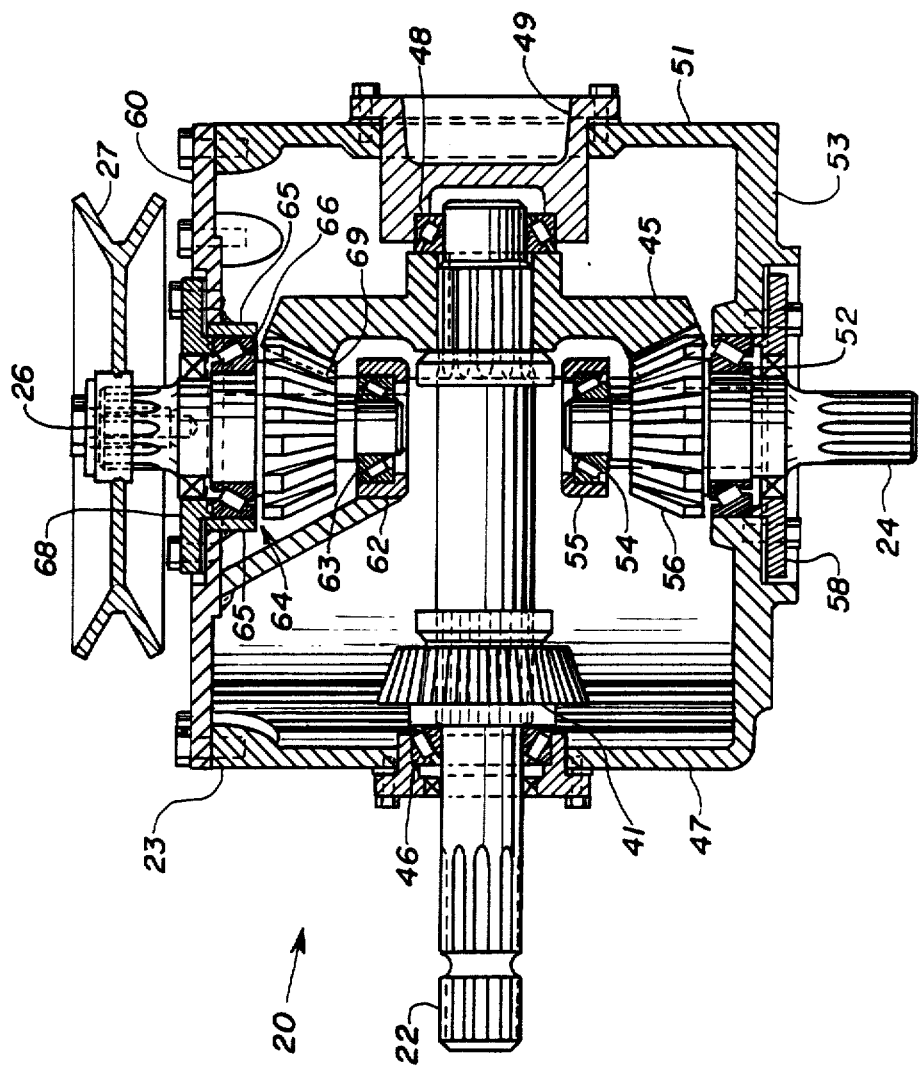
FIG. 4 is a cross-sectional view of the gearbox taken along lines 4—4 of FIG. 3 to provide an elevational view of the gearbox.

Referring now to FIGS. 3 and 4, the details of the gearbox 23 can best be seen. The gearbox 23 is constructed to be oil tight so as to encapsulate an oil bath for lubrication of the gears therewithin to insure proper operation of the intermeshing gears. The power input shaft 22 delivers rotational power from the prime mover into the gearbox 23. A first spur gear 41 mounted on the input shaft 22 is engaged with and transfers rotational power to a second spur gear 43 mounted on the third output shaft 34 to effect rotation of the gearset 35 and a corresponding driving of the conditioning rolls 32, 33. The first and second spur gears 41, 43 are sized to effect an appropriate reduction of rotational speed from the input shaft 22 to the third output shaft 34 to correspondingly effect a rotation of the conditioning rolls 32, 33 at the desired speed.

A main drive gear 45 is affixed to the input shaft 22 for rotation therewith inside of the gearbox 23. The power input shaft 22 is rotatably supported by bearings 46 in the front wall 47 of the gearbox 23 and by bearings 48 supported by a removable cap 49 detachably affixed to the rear wall 51 of the gearbox 23. The first output shaft 24 is rotatably supported by bearings 52 mounted in the bottom wall 53 in the gearbox 23 and by bearings 54 positioned in a support flange 55 formed as part of the gearbox 23 and positioned above the bottom wall 53. A retainer cap 58 is detachably connected to the bottom wall 53 to capture the bearing 52 for rotational support of the shaft 24. The first output shaft 24 is provided with a pinion 56 engagable with the main drive gear 45 to effect rotation thereof and to deliver rotational power thereto.

The gearbox 23 is positioned such that the first output shaft 24 is aligned with the innermost end disc cutter 31 so that the first output shaft 24 delivers rotational power directly to the disc cutterbar 30. For large cutterbars 30, the delivery of rotational power to both end disc cutters 31, 39 permits the cutterbar 30 to be driven by two power trains, each driving half of the disc cutters. A more detailed description of such a cutterbar can be found in a copending patent application entitled "Belt Driven Disc Cutterbar", filed concurrently herewith and given Seral 240,863, the description of which is incorporated herein by reference.

The lid 60 is detachably affixed to the top of the gearbox 23 so as to be removable therefrom. As seen in FIGS. 3 and 4, the lid is provided with a support cup 62 housing a bearing 63 for rotational support of the second output shaft 26. The lid 60 has an opening 64 therein defined by a circular sleeve 65. The sleeve 65 supports a bearing 66 rotatably mounting the second output shaft 26 within the lid 60. A retaining cap 68 is detachably connected to the lid 60 to retain the bearing 66 within the sleeve 65. The support cup 62 diverges upwardly toward the lid 60 to accomodate rotational movement of a pinion 69 affixed to the second output shaft 26 and is open to permit an intermeshing engagement of the pinion 69 with the main drive gear 45 to receive rotational power therefrom.

Since the pinion 69 is identical to the pinion 56, the rotational power delivered to the main drive gear 45 is equally divided between the two pinions 56, 69. Transfer of rotational power from the second output shaft 26 and the sheave 27 mounted thereon to the driven shaft 29 and the sheave 29a mounted thereon can be accomplished by a drive belt 28 entrained around the sheaves 27, 29a providing rotational power directly to the outermost end disc cutter 39 without requiring additional gearboxes. Should a smaller disc cutterbar be utilized, thereby requiring rotational power to be delivered only to the innermost disc cutter 31, the gearbox 23 could be provided with a solid lid 60 devoid of the second output shaft 26 and the supporting structure therefor. In such a gearbox configuration, the rotational power provided from the main drive gear 45 would be conveyed entirely to the first output shaft 24 to provide rotational power to the innermost end disc cutter 31. Manufacture is therefore simplified in that essentially the same gearbox with alternative lid configurations could be provided for both large and small disc mower-conditioners.

The above-described drive mechanism can also be utilized with conventional reciprocating double sickle cutterbars. In such instances, the drive to opposing sides of the cutterbar must be timed for proper operation of the cutterbar. Likewise, some disc cutterbar configurations require proper timing of the driving of the opposing ends of the cutterbar to prevent impact between adjacent disc cutters. In such instances where timing is required, the power transfer mechanism 28 could incorporate a timing belt rather than a conventional V-belt as shown in the drawings.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description may be employed in other embodiments without departing from the scope of the invention. Accordingly, the following claims are intended to protect the invention broadly as well as in the specific form.

Having thus described the invention, what is claimed is:

1. In a mower-conditioner having a frame; a header supported from said frame for generally vertical movement relative thereto, said header having a transverse cutterbar requiring rotational power at the transversely opposing ends thereof for proper operation to sever standing crop material; a conditioning mechanism to receive and condition severed crop material therefrom; and a drive mechanism providing operational power to the transversely opposing ends of said cutterbar and to said conditioning mechanism, an improved drive mechanism comprising:

a power input shaft adapted for connection to a prime mover to deliver rotational power to a gearbox, said gearbox being positioned above an adjacent end of said cutterbar and having a detachable lid, said power input shaft having a main drive gear affixed thereto for rotation therewith inside said gearbox;

a first output shaft rotatably supported from said gearbox and having a first pinion affixed thereto and positioned in intermeshing engagement with said main drive gear to provide rotational power to an adjacent end of said cutterbar, said first output shaft being rotatable in a first direction of rotation;

a second output shaft rotatably supported by said detachable lid and being removable from said gearbox with said detachable lid, said second output shaft having a second pinion affixed thereto and positioned in intermeshing engagement with said main drive gear to provide rotational power for a remote end of said cutterbar, said detachable lid supporting bearings positioned on opposite sides of said second pinion for the rotational support of said second pinion, said second output shaft being rotatable in a second direction of rotation opposite to said first direction of rotation; and a power transfer mechanism to transfer rotational power from said second output shaft to said remote end of said cutterbar.

2. The mower-conditioner of claim 1 wherein said power input shaft also has a secondary gear affixed thereto for rotation therewith inside said gearbox, said drive mechanism further including a third gear affixed to a third output shaft and positioned in intermeshing engagement with said secondary gear to provide rotational power to said conditioning mechanism.

3. The mower-conditioner of claim 2 wherein said third output shaft rotatably drives a gearset operably connected to said conditioning mechanism for rotation thereof.

4. The mower-conditioner of claim 3 wherein said detachable lid includes a support cup depending therefrom and extending into said gearbox when said lid is attached thereto, said second shaft being rotatably supported by first and second bearings mounted in said lid and in said support cup, respectively.

5. A drive mechanism for operably powering a mower-conditioner having a transverse cutterbar with an inboard end and an outboard end transversely spaced from said inboard end, and a rotatable conditioning mechanism, said cutterbar being rotatably driven at both said inboard end and said outboard end, comprising:

a gearbox supported on said mower-conditioner above said inboard end of said cutterbar and including a detachable lid;

a power input shaft adapted for connection to a prime mover and being operable to deliver rotational power from said prime mover into said gearbox, said power input shaft having a main drive gear and a secondary gear affixed thereto for rotation therewith inside of said gearbox;

a first output shaft rotatably supported from said gearbox and having a first pinion affixed thereto and positioned in intermeshing engagement with said main drive gear to provide rotational power in a first direction of rotation to said inboard end of said cutterbar;

a second output shaft rotatably supported in said detachable lid to be removable from said gearbox with said detachable lid and having a second pinion affixed thereto and positioned in intermeshing engagement with said main drive gear to provide rotational power in a second direction of rotation for said outboard end of said cutterbar, said detachable lid including a conical support cup positioned within said gearbox when said lid is attached thereto, said second shaft being rotatably supported by first and second bearings mounted in said lid and in said support cup, respectively, said bearings being positioned on opposing sides of said second pinion;

a power transfer mechanism for transferring rotational power from said second output shaft to said outboard end of said cutterbar; and a third output shaft rotatably supported from said gearbox and having a third pinion affixed thereto and positioned in intermeshing engagement with said secondary gear to provide rotational power to said conditioning mechanism.

6. The drive mechanism of claim 5 wherein said lid further includes a detachable retainer cap affixed thereto for retaining said first bearing in said lid.

7. The drive mechanism of claim 6 wherein said power transfer mechanism includes:

a driven shaft drivingly coupled with said cutterbar at said outboard end thereof;

a first sheave affixed to said second output shaft to be rotatable therewith;

a second sheave affixed to said driven shaft; and an endless belt entrained around said first sheave and said second sheave to transfer rotational power from said first sheave to said second sheave.

8. The drive mechanism of claim 7 wherein said cutterbar includes a plurality of transversely spaced disc members operable to sever standing crop material by impact action upon rotation of said disc members.

* * * * *